US012630223B2

(12) United States Patent
Satoi et al.

(10) Patent No.: US 12,630,223 B2
(45) Date of Patent: May 19, 2026

(54) VEHICLE REAR STRUCTURE

(71) Applicant: TOYOTA JIDOSHA KABUSHIKI KAISHA, Toyota (JP)

(72) Inventors: Taisuke Satoi, Okazaki (JP); Yuta Egawa, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 399 days.

(21) Appl. No.: 18/542,989

(22) Filed: Dec. 18, 2023

(65) Prior Publication Data

US 2024/0208573 A1    Jun. 27, 2024

(30) Foreign Application Priority Data

Dec. 26, 2022    (JP) ................................. 2022-207923

(51) Int. Cl.
| | |
|---|---|
| *B62D 21/11* | (2006.01) |
| *B62D 25/04* | (2006.01) |
| *B62D 25/06* | (2006.01) |
| *B62D 25/08* | (2006.01) |

(52) U.S. Cl.
CPC .............. *B62D 21/11* (2013.01); *B62D 25/04* (2013.01); *B62D 25/06* (2013.01); *B62D 25/08* (2013.01)

(58) Field of Classification Search
None
See application file for complete search history.

(56) References Cited

U.S. PATENT DOCUMENTS

| | | | | |
|---|---|---|---|---|
| 9,493,191 | B2 * | 11/2016 | Kariniemi | .............. B62D 21/11 |
| 2021/0016840 | A1 * | 1/2021 | Moss | .................... B62D 21/152 |
| 2023/0303180 | A1 * | 9/2023 | Kim | ..................... B62D 25/087 |

FOREIGN PATENT DOCUMENTS

| | | | | |
|---|---|---|---|---|
| DE | 102017011778 A1 * | 8/2018 | ............. | B62D 21/15 |
| JP | H06-286652 A | 10/1994 | | |
| JP | 2010247612 A * | 11/2010 | | |

OTHER PUBLICATIONS

"Mercedes-AMG GT 2nd AMG development, GT car with space frame structure", Motor Fan illustrated, Jun. 24, 2019 URL<https://car.motor-fan.jp/tech/10010224>.
"Introducing the 296GT3, "designed only to win and carving a new page in Ferrari racing history"! Non-hybrid V6 turbo, 600 horsepower", Jul. 30, 2022 URL<https://intensive911.com/italian-car-brand/ferrari/260154/>.
Salaverria, "Intensive Use of Aluminium in Car Body Construction", 12th EAEC European Automotive Congress, Bratislava (Jun. 2009).

* cited by examiner

*Primary Examiner* — Aaron L Lembo
(74) *Attorney, Agent, or Firm* — SoraIP, Inc.

(57) ABSTRACT

The vehicle rear structure includes a rear structural member connected to a rear end of a rocker and a rear pillar and extending rearward, and a connection member connected to the rear pillar and the rear structural member, wherein the rear structural member is an integrally cast hollow member and is composed of a body portion, a tower portion, and a suspension member portion. The body portion has a closed cross-section and is connected to the rear pillar and the rear member. The suspension member portion has a space, the suspension portion has a closed cross-section, is arranged below the main body portion, and has a front end connected to the rocker and the rear pillar.

3 Claims, 3 Drawing Sheets

VEHICLE REAR STRUCTURE

CROSS-REFERENCE TO RELATED APPLICATION

This application claims priority to Japanese Patent Application No. 2022-207923 filed on Dec. 26, 2022, incorporated herein by reference in its entirety.

BACKGROUND

1. Technical Field

The present disclosure relates to a vehicle rear structure.

2. Description of Related Art

Conventionally, various structures have been proposed for improving strength of vehicle rear structures.

For example, Japanese Unexamined Patent Application Publication No. 06-286652 (JP 06-286652 A) discloses an body structure of an automobile in which a rear suspension tower and surroundings of the rear suspension tower are integrally formed by cast members. It is said that with such a configuration, when external input occurs, input load can be distributed, and portions where the input becomes great can be efficiently reinforced. It is also said that the integration by cast members can suppress the structure from becoming complicated.

Also, for example, there are cases in which the strength of the vehicle rear structure is improved by setting a greater plate thickness for members used for the rear suspension tower, a rear pillar, and so forth.

SUMMARY

Now, structural contrivances for increasing strength in the vehicle rear structure may lead to other issues as well. For example, setting the plate thickness of the component members to be greater increases the weight of the vehicle. Moreover, greater complexity of the structure may lead to increase in man-hours and increase in costs.

Accordingly, the present specification realizes a vehicle rear structure capable of achieving weight reduction, while ensuring strength.

The vehicle rear structure disclosed in the present specification includes a rear structural member connected to a rear end of a rocker and a rear pillar attached to a rear end portion of the rocker and extending rearward in a vehicle, and a connection member connected to the rear pillar and the rear structural member.

The rear structural member is a hollow member that is integrally cast, and is made up of a main body portion, a tower portion, and a suspension member portion.

The main body portion is a member with a closed cross-section, extending in a vehicle front-rear direction, and being connected to the rear pillar and a rear member disposed at a rear portion of the vehicle.

The tower portion is connected to an upper end of the main body portion and contains a space that accommodates a portion of a suspension.

The suspension member portion is a member with a closed cross-section and extending in the vehicle front-rear direction below the main body portion, and a front end of the suspension member portion is connected to the rocker and the rear pillar.

The connection member is an elongated member with a closed cross-section, extending in a direction obliquely rearward and upward in the vehicle from above a position at which the rear pillar and the main body portion are connected, and being connected to an upper end of the tower portion.

According to the above configuration, the rear structural member is integrally formed by casting, and further, the main body portion and the suspension member portion have closed cross-sections, so that the strength can be increased as compared to when assembling by spot welding or the like. Further, weight can be reduced due to thinner materials. Also, man-hours for performing joining such as welding and so forth can be reduced, and costs can be reduced by reducing the number of separate members.

Also, in the vehicle rear structure, the connection member, the main body portion, and the tower portion may make up a first truss structure.

According to the above configuration, the first truss structure can realize a vehicle rear structure with higher strength and rigidity.

Also, the vehicle rear structure may further include a roof rail that is an elongated member with a closed cross-section is connected to an upper end of the rear pillar, extends in the vehicle front-rear direction, and is connected to the upper end of the tower portion.

The connection member, the rear pillar, and the roof rail may make up a second truss structure.

According to the above configuration, providing the two truss structures of the first truss structure and the second truss structure enables a vehicle rear structure to be realized with even higher strength and rigidity.

According to the vehicle rear structure disclosed in the present specification, a configuration capable of achieving weight reduction while ensuring strength and rigidity can be realized. Also, integral formation by casting enables reduction in the number of man-hours for performing joining, and reduction in costs by reducing the number of separate members.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

The vehicle rear structure will be described below with reference to the drawings. In the following description, the rear structure of the right side of the vehicle will be described. Since the rear structure on the left side of the vehicle is generally symmetrical with the rear structure on the right side, the description thereof is omitted. Also, in each figure, "Fr" indicates the front of the vehicle. In each figure, "Up" indicates the upper side of the vehicle. In each figure, "Rh" indicates the right side of the vehicle.

Figure 1:
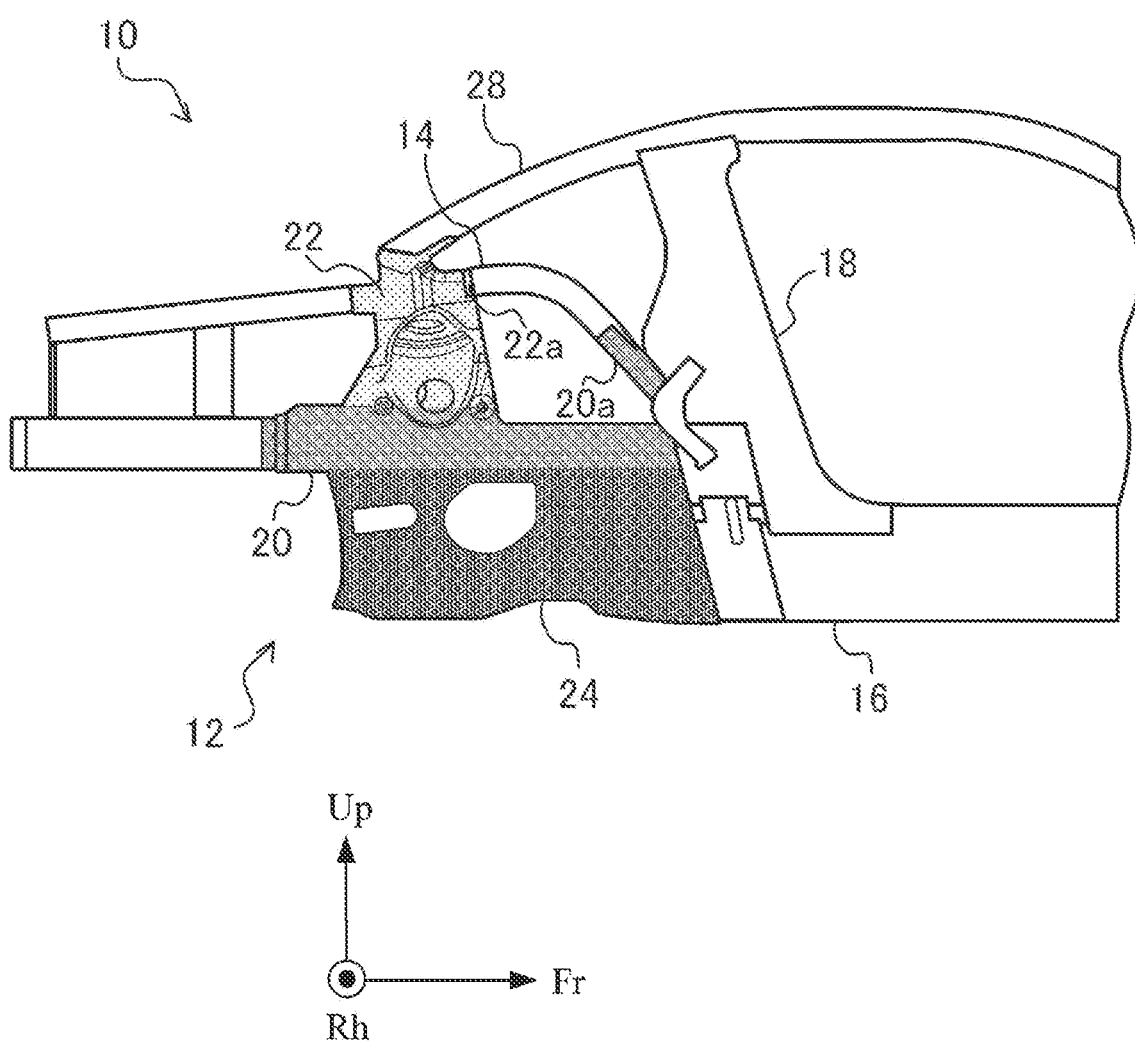
FIG. 1 is a side view schematically showing the vehicle rear structure.

FIG. 1 is a side view schematically showing the vehicle rear structure. More specifically, FIG. 1 is a diagram showing a rear structural member 12, which is a structural member in the rear structure of a vehicle 10, and main members around it. Accordingly, illustration and description of other members are omitted as appropriate. As shown in FIG. 1, the vehicle rear structure includes a rear structural member 12, a connection member 14, a rocker 16, and a rear pillar 18.

The rear structural member 12 is an integrally cast hollow member and is composed of a main body portion 20, a tower portion 22 and a suspension member portion 24. The rear structural member 12 is a casting member made of metal such as aluminum. As shown in FIG. 1, the rear structural member 12 is connected to the rear end of the rocker 16 and the rear pillar 18 and extends rearward of the vehicle. An assembly portion 20*a* is formed at the front upper corner of the main body portion 20. The assembly portion 20*a* is a portion to which the front end of the connection member 14 is assembled. A receiving seat 22*a* is formed near the upper end of the tower portion 22 and at the front end thereof. The receiving seat 22*a* is a part to which the rear end of the connection member 14 is assembled. Details of the rear structural member 12 will be described later with reference to FIGS. 2 and 3.

The connection member 14 is an elongated member with a closed cross-section and is connected to the rear pillar 18 and the rear structural member 12. In this example, the connection member 14 is a rectangular tube-shaped extruded member. The connection member 14 may be a casting member made of the same metal such as aluminum as the rear structural member 12, or may be a steel pipe or the like. Further, connection member 14 may be cylindrical. The connection member 14 will also be described in detail later with reference to FIG. 2.

The rocker 16 is a member that has a square closed cross-sectional shape, is provided at a lower side end portion of the vehicle 10 (specifically, a position immediately below the left and right doors) and extends in the vehicle front-rear direction.

The rear pillar 18 is a member that has a closed cross-sectional shape, is provided on the rear side of the vehicle 10, and extends in the vertical direction of the vehicle. More specifically, the rear pillar 18 is attached to the rear end portion of the rocker 16 and arranged to extend upward from the rocker 16.

Figure 2:
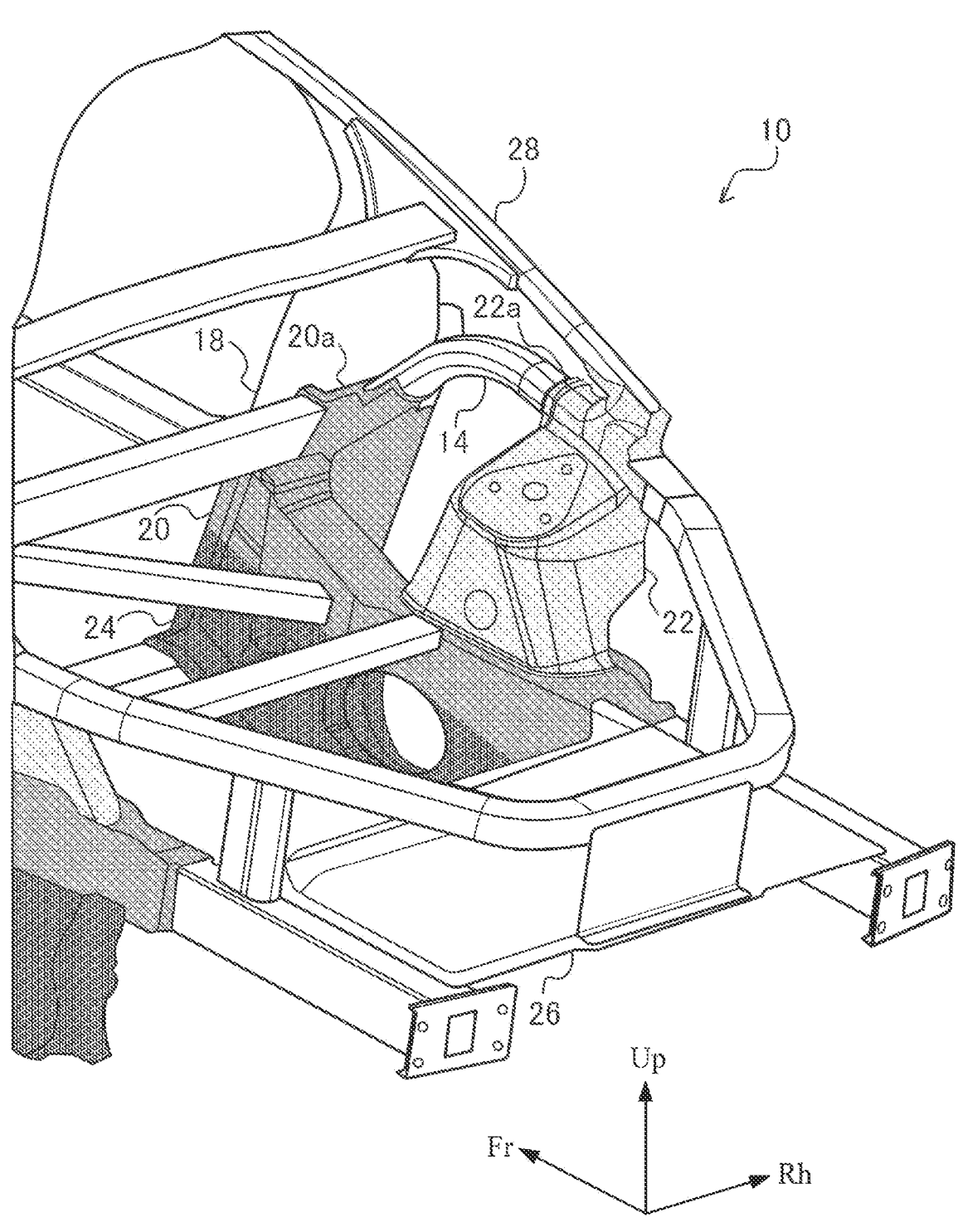
FIG. 2 is a schematic perspective view of the vehicle rear structure of FIG. 1.

Next, with reference to FIGS. 1 and 2, members around the rear structural member 12 will be further described. FIG. 2 is a schematic perspective view of the vehicle rear structure of FIG. 1. More specifically, FIG. 2 is a schematic perspective view when the vehicle 10 is viewed from the upper left rear portion of the vehicle.

As shown in FIG. 2, the vehicle rear structure further includes a rear member 26 and roof rails 28.

The rear member 26 is arranged at the rear portion of the vehicle. A portion of the tip of the rear member 26 is connected to the rear end of the rear structural member 12.

The roof rail 28 is a member arranged at the boundary between the roof and the sides of the vehicle 10. The roof rail 28 is an elongated member having a closed cross-section and extends in the vehicle front-rear direction at the side end portion of the upper portion of the vehicle 10. As shown in FIGS. 1 and 2, the central portion of the roof rail 28 is connected to the upper end of the rear pillar 18. A rear portion of the roof rail 28 extends obliquely rearward of the vehicle from the connection portion toward the upper end of the tower portion 22. The rear end is connected to the upper end of the tower portion 22.

Figure 3:
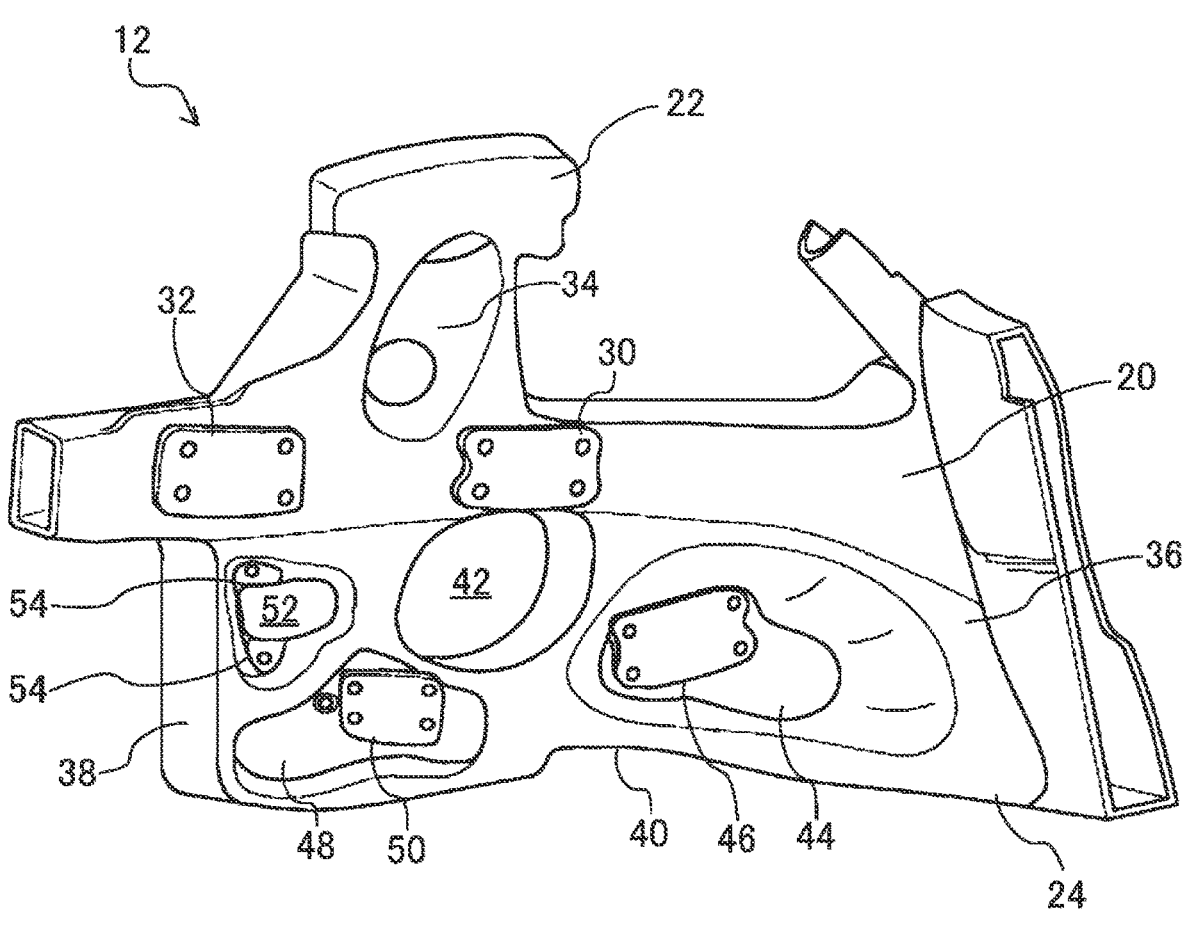
FIG. 3 is a perspective view of the rear structural member.
Figure 3:
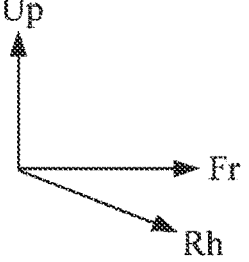

The rear structural member 12 will now be described with reference to FIGS. 1 to 3. FIG. 3 is a perspective view of the rear structural member. As described above, the rear structural member 12 is an integrally cast hollow member and is composed of the main body portion 20, the tower portion 22 and the suspension member portion 24. In FIGS. 1 and 2, in order to distinguish between the main body portion 20, the tower portion 22, and the suspension member portion 24, the tower portion 22 arranged at the top in the vertical direction of the vehicle is shown as a light shaded portion in consideration of visibility. In FIGS. 1 and 2, the lower suspension member portion 24 is shown as a dark black portion. Also, the main body portion 20 in the intermediate portion is shown in these intermediate colors.

The main body portion 20 is a portion that at least partially has a closed cross-section and extends in the vehicle front-rear direction. A front end of the main body portion 20 is connected to the rocker 16 and the rear pillar 18. Although the main body portion 20 is connected to the rocker 16 and the rear pillar 18 here, it is not limited to this, and may be connected via a connection member or the like. The rear end of the main body portion 20 is connected to a portion of the tip of the rear member 26 (more specifically, the tip of the rear side member that constitutes the rear member 26).

As shown in FIG. 3, pedestals 30 and 32 are provided on the surface of the right side plate of the main body portion 20. Pedestals 30 and 32 are portions to which arm brackets (not shown) to which upper arms (not shown) of suspensions (not shown) are connected are fixed. Pedestals 30 and 32 are provided with bolt holes for fixing arm brackets.

The tower portion 22 is a portion that is connected to the upper end of the main body portion 20 and has a recess portion 34 that accommodates a portion of the suspension. The tower portion 22 is composed of a right side plate, a left side plate, a front plate, a rear plate, and a ceiling plate. The right side plate, the left side plate, the front plate, and the rear plate form a closed cross-sectional structure extending upward from the main body portion 20. A roof rail 28 is connected to the right end of the ceiling plate (see FIG. 2). As described above, the tower portion 22 includes a receiving seat 22*a* (see FIGS. 1 and 2). The receiving seat 22*a* is a portion to which the rear end of the connection member 14 is assembled (that is, the connection member 14 is fixed). The receiving seat 22*a* is preferably open at the top and closed at the bottom. With such a configuration, the connection member 14 can be inserted from above and fixed. In addition, as described above, the connection member 14 may be made of the same material as that of the rear structural member 12, or may be made of a different material. Additionally, the connection member 14 may be integral with the rear structural member 12.

The suspension member portion 24 is a portion that has a closed cross-section at least partially and extends in the vehicle front-rear direction below the main body portion 20. As shown in FIG. 3, the suspension member portion 24 is composed of a right side plate 36, a left side plate (not shown), a rear plate 38 and a lower plate 40. The suspension member portion 24 is a hollow member with a closed cross-section surrounded by the right side plate 36, the left side plate, the rear plate 38, the front plate (not shown), the lower plate 40, and the lower plate (not shown) of the main body portion 20 on the right side, the left side, the rear side, the front side, the lower side, and the upper side. The front plate of the suspension member portion 24 includes portions connected to the rocker 16 and the rear pillar 18.

As shown in FIG. 3, a cylindrical opening 42 through which a drive shaft (not shown) of the vehicle 10 passes is provided in the center of the suspension member portion 24. A mortar-shaped recess 44 is provided in front of the right side plate 36. The bottom of the recess 44 is flat. A pedestal 46 is provided at the bottom. Further, a recess 48 recessed in a step shape from the surface of the right side plate 36 is provided on the rear lower side of the right side plate 36. A pedestal 50 is provided at the bottom of the recess 48. An oval opening 52 is provided on the rear upper side of the right side plate 36. The peripheral portion of the opening 52 and the surface of the right side plate 36 are connected by an inclined curved surface. A pedestal 54 is provided on each of the upper and lower portions of the opening 52. Pedestals 46 and 50 are portions to which arm brackets to which suspension lower arms (not shown) are connected are fixed. A pedestal 54 is a portion to which an arm bracket to which a middle arm (not shown) of the suspension is connected is fixed. The pedestals 46, 50, 54 are provided with bolt holes for fixing the arm brackets.

Here, as explained above, since the rear structural member 12 is a hollow member, it is lighter than a solid member. Furthermore, the strength is improved by adopting the configuration as described above. That is, in general, the connecting portion between the three members that constitute the rear structural member 12 tends to become a weak portion where stress concentrates. However, by integrally casting the three members, such connecting parts can be eliminated, so the strength of the vehicle body around the suspension is improved. As a result, in the vehicle rear structure disclosed in this specification, it is possible to achieve both strength and weight reduction. Furthermore, by integrally casting the rear structural member 12, it is possible to reduce the number of man-hours for joining and to reduce the cost by reducing the number of separate members. Further, by reducing the number of separate members, it is possible to further reduce the weight of the vehicle.

Next, returning to FIG. 2, the connection member 14 will be described. The connection member 14 is connected to the rear pillar 18 and the rear structural member 12 at its front end, and is connected to the tower portion 22 at its rear end. In other words, the connection member 14 is a member that connects the main body portion 20 and the tower portion 22 of the rear structural member 12. More specifically, the connection member 14 is connected above the position where the rear pillar 18 and the main body portion 20 of the rear structural member 12 are connected (the assembly portion 20*a* shown in FIG. 2). The connection member 14 extends obliquely upward toward the rear of the vehicle from above the connection position between the rear pillar 18 and the main body portion 20, and is connected to the upper end of the tower portion 22 (receiving seat 22*a* portion shown in FIGS. 1 and 2).

Here, referring to FIG. 1, the connection member 14, the main body portion 20, and the tower portion 22 form a truss structure (hereinafter referred to as "first truss structure") in which a cross section substantially orthogonal to the vehicle width direction forms a substantially triangular shape. In the truss structure, even when a load is applied to each member forming a substantially triangular shape, only compressive force or tensile force is generated in the axial direction, making it difficult to receive bending moment. That is, due to the configuration in which such a first truss structure is provided, the vehicle rear structure disclosed in this specification has a higher strength.

Further, referring to FIG. 1, the connection member 14, the rear pillar 18, and the roof rail 28 form a truss structure (hereinafter referred to as "second truss structure") in which a cross section substantially orthogonal to the vehicle width direction forms a substantially triangular shape. That is, two truss structures, the first truss structure and the second truss structure, are formed. With such a configuration, the vehicle rear structure disclosed in this specification becomes a structure with higher strength and rigidity.

As described above, in the vehicle rear structure disclosed in the present specification, the integrally cast hollow member includes the rear structural member 12 including the main body portion 20, the tower portion 22, and the suspension member portion 24, and the connection member 14 connected to the rear pillar 18 and the rear structural member 12. The first truss structure and the second truss structure are provided around the rear structural member 12 with the connection member 14 as the center. A configuration capable of reducing the weight is realized.

Note that the description so far is only an example. In the vehicle rear structure disclosed in this specification, it is sufficient that the integrally cast hollow member includes a rear structural member including a main body portion, a tower portion, and a suspension member portion, and a connection member connected to the rear pillar and the rear structural member, and the connection member extends obliquely upward to the rear of the vehicle from a position where the rear pillar and the main body portion are connected, and is connected to the upper end of the tower portion. Therefore, other configurations of the vehicle rear structure may be changed as appropriate. In addition, the connection member may not be separated from the rear structural member, but may be integrated with the rear structural member.

What is claimed is:

1. A vehicle rear structure, comprising:
   a rear structural member connected to a rear end of a rocker and a rear pillar attached to a rear end portion of the rocker and extending rearward in a vehicle; and
   a connection member connected to the rear pillar and the rear structural member, wherein:
   the rear structural member is a hollow member that is integrally cast, and is made up of a main body portion, a tower portion, and a suspension member portion;
   the main body portion is a member with a closed cross-section, extending in a vehicle front-rear direction, and being connected to the rear pillar and a rear member disposed at a rear portion of the vehicle;
   the tower portion is connected to an upper end of the main body portion and contains a space that accommodates a portion of a suspension;
   the suspension member portion is a member with a closed cross-section and extending in the vehicle front-rear direction below the main body portion, and a front end of the suspension member portion is connected to the rocker and the rear pillar; and
   the connection member is an elongated member with a closed cross-section, extends in a direction obliquely rearward and upward in the vehicle from above a position at which the rear pillar and the main body portion are connected, and is connected to an upper end of the tower portion.

2. The vehicle rear structure according to claim 1, wherein the connection member, the main body portion, and the tower portion make up a first truss structure.

3. The vehicle rear structure according to claim 2, further comprising a roof rail that is an elongated member with a closed cross-section is connected to an upper end of the rear pillar, extends in the vehicle front-rear direction, and is connected to the upper end of the tower portion, wherein the connection member, the rear pillar, and the roof rail make up a second truss structure.

\* \* \* \* \*